United States Patent
Gao et al.

(10) Patent No.: US 10,491,502 B2
(45) Date of Patent: Nov. 26, 2019

(54) SOFTWARE TAP FOR TRAFFIC MONITORING IN VIRTUALIZED ENVIRONMENT

(71) Applicant: Nicira, Inc., Palo Alto, CA (US)

(72) Inventors: Zhenyu Gao, Beijing (CN); Jingchun Jiang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 118 days.

(21) Appl. No.: 15/217,937

(22) Filed: Jul. 22, 2016

(65) Prior Publication Data
US 2018/0006923 A1 Jan. 4, 2018

Related U.S. Application Data

(60) Provisional application No. 62/356,509, filed on Jun. 29, 2016.

(51) Int. Cl.
H04L 12/26 (2006.01)
(52) U.S. Cl.
CPC ............ H04L 43/12 (2013.01); H04L 43/062 (2013.01)
(58) Field of Classification Search
None
See application file for complete search history.

(56) References Cited

U.S. PATENT DOCUMENTS

| | | | | |
|---|---|---|---|---|
| 9,614,891 B1* | 4/2017 | Evenson | .................. | H04L 67/02 |
| 2005/0169213 A1* | 8/2005 | Scian | .............. | H04M 1/274516 |
| | | | | 370/329 |
| 2011/0149808 A1* | 6/2011 | Yared | ...................... | H04L 29/06 |
| | | | | 370/259 |
| 2014/0003249 A1* | 1/2014 | Cai | ......................... | H04L 43/10 |
| | | | | 370/241 |
| 2014/0134996 A1* | 5/2014 | Barclay | ................. | H04W 24/08 |
| | | | | 455/422.1 |
| 2015/0089045 A1* | 3/2015 | Agarwal | ................. | H04L 43/04 |
| | | | | 709/224 |
| 2015/0100962 A1* | 4/2015 | Morita | ................ | G06F 9/45558 |
| | | | | 718/1 |
| 2016/0162312 A1* | 6/2016 | Doherty | .................. | G06F 11/30 |
| | | | | 718/1 |
| 2016/0182336 A1* | 6/2016 | Doctor | .................. | H04L 43/062 |
| | | | | 709/224 |
| 2017/0099195 A1* | 4/2017 | Raney | .................... | H04L 43/028 |
| 2017/0118102 A1* | 4/2017 | Majumder | .......... | G06F 9/45558 |
| 2017/0163510 A1* | 6/2017 | Arora | .................. | H04L 43/0876 |
| 2017/0163602 A1* | 6/2017 | Douglass | ............ | H04L 63/0227 |
| 2017/0366638 A1* | 12/2017 | Suzuki | ................ | G06F 9/45558 |

\* cited by examiner

*Primary Examiner* — Brandon M Renner
*Assistant Examiner* — Jay L Vogel
(74) *Attorney, Agent, or Firm* — Adeli LLP (57) ABSTRACT

Some embodiments provide a system for lossless packet monitoring in a virtualized. The system, using a virtual tap, intercepts packets from a data compute node operating on a host machine, between the data compute node (DCN) and a managed forwarding element on the host. As part of the lossless packet mirroring, the virtual tap forwards data files related to the mirrored packets to a traffic monitoring. The traffic monitoring application stores the data received from the virtual tap and is capable of performing analytics on the stored data. In some embodiments, the system also includes a central controller that communicates with the other elements of the system to manage the traffic monitoring.

20 Claims, 7 Drawing Sheets

SOFTWARE TAP FOR TRAFFIC MONITORING IN VIRTUALIZED ENVIRONMENT

BACKGROUND

Network traffic monitoring and analyzing has a significant value for traffic analysis and trouble-shooting, and therefore mirroring is widely used in network intrusion detection systems, VoIP recording, network probes, remote network monitoring (RMON) probes, packet sniffers, and other monitoring and collection devices and software. In a virtualized environment, however, the transparent monitoring of traffic still faces many challenges. The invisibility of network flow direction and distribution leads to numerous safety lapses. The first step for fulfilling a monitoring requirement in any environment is to have a feasible way to access all of the network traffic of interest. In a physical environment, two ways are commonly used to fulfill the goal of traffic access.

First, a network tap is a passive splitting mechanism installed between a device of interest and the network. A network tap transmits input/output traffic simultaneously on separate links, ensuring all traffic arrives at monitoring device in real time. The advantage of a tap is that it never drops packets, regardless of bandwidth saturation. Therefore, it can fulfill the goal of lossless traffic monitoring. Nevertheless, its high equipment cost and difficulty in deployment limit its scope of application.

Second, port mirroring, also known as SPAN (Switched Port Analyzer), RSPAN (Remote Switched Port Analyzer), and ERSPAN (Encapsulated Remote Switched Port Analyzer) is capable of sending a copy of network packets to a network-monitoring device connected to another switch port. As packet mirroring is a subordinate function in a switch, the switch places a lower priority on SPAN port data than it places on regular port-to-port data. Port mirroring is widely applied by today's medium- and high-end switches for traffic monitoring and analyzing. A switch with a port mirroring function has the advantage of low cost and easy deployment and remote deployment as well.

However, when it comes to virtualized environments, neither of the techniques mentioned above are easily applied. To monitor virtual traffic by either of the above methods, the first thing one needs to do is to transfer traffic from the virtual environment to the physical environment. Once that is done, either TAP or port mirroring can be used to perform traffic monitoring. However, hardware outside of a hypervisor cannot be aware of inter-VM traffic within a host, and any kind of packet loss that happens within the virtual environment is invisible to such a method.

In recent years, the significant shift to virtualization has yielded great efficiency benefits. However, the invisibility of traffic in virtualized environments creates significant problems for traffic monitoring, and as the shift to virtualization continues, issues relating to traffic monitoring need to be resolved. Additionally, considering the virtualization environment, the shortage of both CPU resources and network resources also remains a most worrisome problem when conducting lossless traffic monitoring.

BRIEF SUMMARY

Some embodiments of the invention provide a system for lossless packet monitoring in a virtualized environment. The system, using a virtual tap, intercepts packets from a data compute node (e.g., a virtual machine (VM) or container) operating on a host machine, between the data compute node (DCN) and a managed forwarding element (e.g., a virtual switch) on the host. As part of the lossless packet mirroring, the virtual tap forwards data files related to the mirrored packets to a traffic monitoring application (e.g., an application operating in a separate DCN on the host). The traffic monitoring application stores the data received from the virtual tap (e.g., in a traffic data file) and is capable of performing analytics on the stored data (e.g., searching for specific packets from the data that meet certain criteria). In some embodiments, the system also includes a central controller that communicates with the other elements of the system to manage the traffic monitoring (e.g., identifying the DCNs for which to perform traffic monitoring, configuring the traffic monitoring applications on the hosts).

In some embodiments, the virtual tap performs lossless packet mirroring by assigning a higher priority to packet mirroring operations than it does to original packet transmission and receipt. This may result in the virtual tap preventing the addition of data to a virtual network interface card's (vNIC's) I/O ring, blocking the net output ring of the mirrored port, or dropping packets for the mirrored ports until the mirrored data has reached its destination. The virtual tap in some embodiments will populate mirrored packets in a TCP payload and may also include metadata (e.g., pcap data). In some embodiments, the virtual tap executes as a module in the kernel of the hypervisor of the host machine.

In some embodiments, traffic monitoring applications may be deployed in a distributed manner, in multiple host machines. In such a distributed packet monitoring system, a virtual tap may determine whether to forward the mirrored packet data to a local traffic monitoring application executing on the same host or a traffic monitoring application executing on another host, based on the resources available on the host machine (e.g., memory or CPU resources) or the network resources.

In some embodiments, traffic monitoring applications store the received data in a format (e.g., libpcap) that is compatible with other analysis applications (e.g., wireshark or tcpdump). In some embodiments, the received files are organized by mirrored-traffic session and may further be ordered as a timeline. In some embodiments, an out-date strategy (e.g., a Least Recently Used (LRU) algorithm) is employed to clean up the stored file system to remove unnecessary files (e.g., old or never-touched files).

The traffic monitoring applications of some embodiments perform analysis on the received data for presentation to a user (e.g., searching for specific packets from a data traffic file that match a condition, such as "TCP.src.ip=10.*.2.*", and parsing the returned data into a user-readable format such as an html document). In some embodiments, the traffic monitoring application exposes application programming interfaces (APIs) for third-party software (e.g., wireshark or tcpdump) to access its stored packet data. The accessed data in some embodiments may be processed by the traffic monitoring application or may be raw data.

In some embodiments, a central controller communicates with a virtual tap. For instance, the central controller may establish a data pipe (e.g., a thrift data pipe) between it and a traffic monitoring application through which it provides instructions to a traffic monitoring application and a virtual tap in some embodiments. Some instructions are directed to the traffic monitoring application (e.g., search queries) while others are directed to the virtual tap. The traffic monitoring application transmits the latter instructions to the virtual tap on the host. These instructions for the virtual tap may specify, for example, an identification of a DCN to be monitored, a filter to be applied to the mirrored packets, a format of the forwarded mirrored packet data, or a format or type of meta data associated with mirrored packets.

In some embodiments, the central controller acts as both a controller and a traffic monitoring application. That is, the central controller may receive traffic monitoring data from the traffic monitoring applications on the hosts. In some embodiments, the controller aggregates this data for analysis, and exposes APIs for third-party software (e.g., wireshark or tcpdump) to access the received data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a system for lossless packet monitoring in a virtualized environment. The system, using a virtual tap (e.g., vTap kernel), intercepts packets from a data compute node (e.g., a virtual machine (VM) or container) operating on a host machine, between the data compute node (DCN) and a managed forwarding element (e.g., a virtual switch) on the host. As part of the lossless packet mirroring, the virtual tap forwards data files related to the mirrored packets to a traffic monitoring application. The traffic monitoring application stores the data files received from the virtual tap (e.g., in a traffic data file) and is capable of performing analytics on the stored data (e.g., searching for specific packets from the data that meet certain criteria). In some embodiments, the system also includes a central controller that communicates with the other elements of the system to manage the traffic monitoring (e.g., identifying the DCNs for which to perform traffic monitoring, configuring the traffic monitoring applications on the hosts, etc.).

Figure 1:
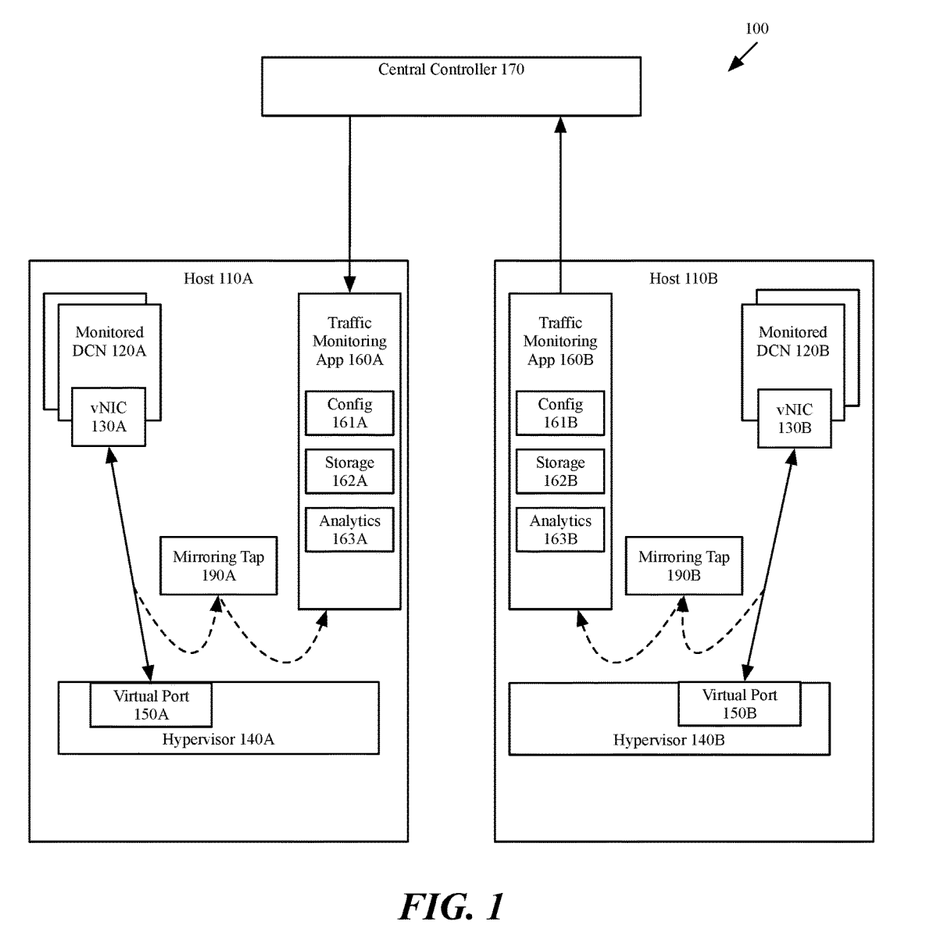
FIG. 1 illustrates a system for lossless packet monitoring in a virtualized environment.

FIG. 1 illustrates a system for lossless packet monitoring in a virtualized environment 100. The figure illustrates hosts 110A and 110B on which a plurality of data compute nodes (DCNs) are hosted. Hosts 110A and 1110B host monitored DCNs 120A and 120B, respectively, as well as traffic monitoring applications 160A and 160B, respectively. The figure also illustrates that monitored DCNs 120A and 120B have virtual network interface cards (vNICs) 130A and 130B, respectively. The figure also illustrates mirroring taps 190A and 190B that perform the packet mirroring functions. The figure also illustrates hypervisors 140A and 140B (which could be any sort of virtualization software that enables the virtualization of the hosts 110A and 110B). Hypervisors 140A and 140B each execute at least one software managed forwarding element (not shown) with virtual ports 150A and 150B, respectively. A central controller 170 is also illustrated in FIG. 1.

Virtualized environment 100 in some embodiments is implemented by a collection of computing and networking resources provided to various tenants or subscribers. In some embodiments, virtualized environment 100 includes DCNs (e.g., monitored DCNs 120A and 120B), logical networks, hypervisors, forwarding elements, and network constructs. In some embodiments, these networking and computing resources are provided by computing devices that are referred to as host machines (e.g., host machines 110A and 110B) that operate or "host" virtual machines and various components of the logical networks. The host machines are physically interconnected by a physical network infrastructure, which can be wired or wireless communication mediums that physically relay signals and data between the different host machines. The forwarding elements (e.g., in the virtualization software) operate to implement logical networks for one or more tenants in some embodiments.

Hosts 110A and 110B may each host a plurality of DCNs. In some embodiments, the plurality of DCNs may comprise a plurality of monitored DCNs, unmonitored DCNs (not shown), and one or more traffic monitoring applications. In some embodiments, host 110A includes hypervisor 140A. In some embodiments, hypervisor 140A further includes virtual port 150A of a virtual switch (not shown) to which DCN 120A directs network traffic. Although reference has been made only to host 120A it is understood that host 120B may be implemented as in any of the embodiments discussed for host 120A.

In some embodiments, monitored DCNs 120A and 120B are DCNs for which traffic monitoring has been enabled. In some embodiments, monitored DCNs 120A and 120B belong to different tenants in the virtualized environment 100. All of the DCNs on one host may belong to one tenant, or may belong to different tenants, and tenants may have DCNs on both of the hosts 110A and 110B. Monitored DCNs in some embodiments serve different functions (e.g., database server, web server, application server, etc.).

Mirroring taps 190A and 190B, in some embodiments, perform lossless mirroring of packets using a process described by reference to FIG. 4 (or a similar process). In some embodiments, a mirroring tap is executed as a module in the hypervisor. Mirroring tap 190A performs packet mirroring at the I/O chain of the vNIC 130A. In some embodiments, mirroring tap 190A identifies a packet sent from DCN 120A (through vNIC 130A) to virtual port 150A and copies the packet data before the packet is received at virtual port 150A. Mirroring tap 190A populates a TCP payload with a plurality of mirrored (e.g., copied) packets in some embodiments, as will be discussed later in relation to FIG. 5. In some embodiments, the TCP payload also includes metadata relating to the mirrored packets (e.g., operating system of the sniffer machine, software used to create the packet, name of the interface where packets are captured, description of interface where packets are captured, capture filter used when sniffing packets, cached name resolution entries, user comments on individual frames, etc.).

Mirroring tap 190A achieves lossless mirroring in some embodiments by assigning a highest priority to the mirroring operations or the mirrored packet payloads. In some embodiments, assigning a highest priority to the mirroring operations or the mirrored packet payloads results in mirroring tap 190A blocking original traffic if resources are insufficient to process both original traffic and mirrored traffic. Blocking may be performed in some embodiments, by blocking a net output ring or dropping incoming packets on a particular mirrored port. For example, mirroring tap 190A prevents a DCNs vNIC from inserting data into its I/O ring until a previous set of mirrored packets (e.g., TCP payload populated with original packets) has reached its destination.

Figure 4:
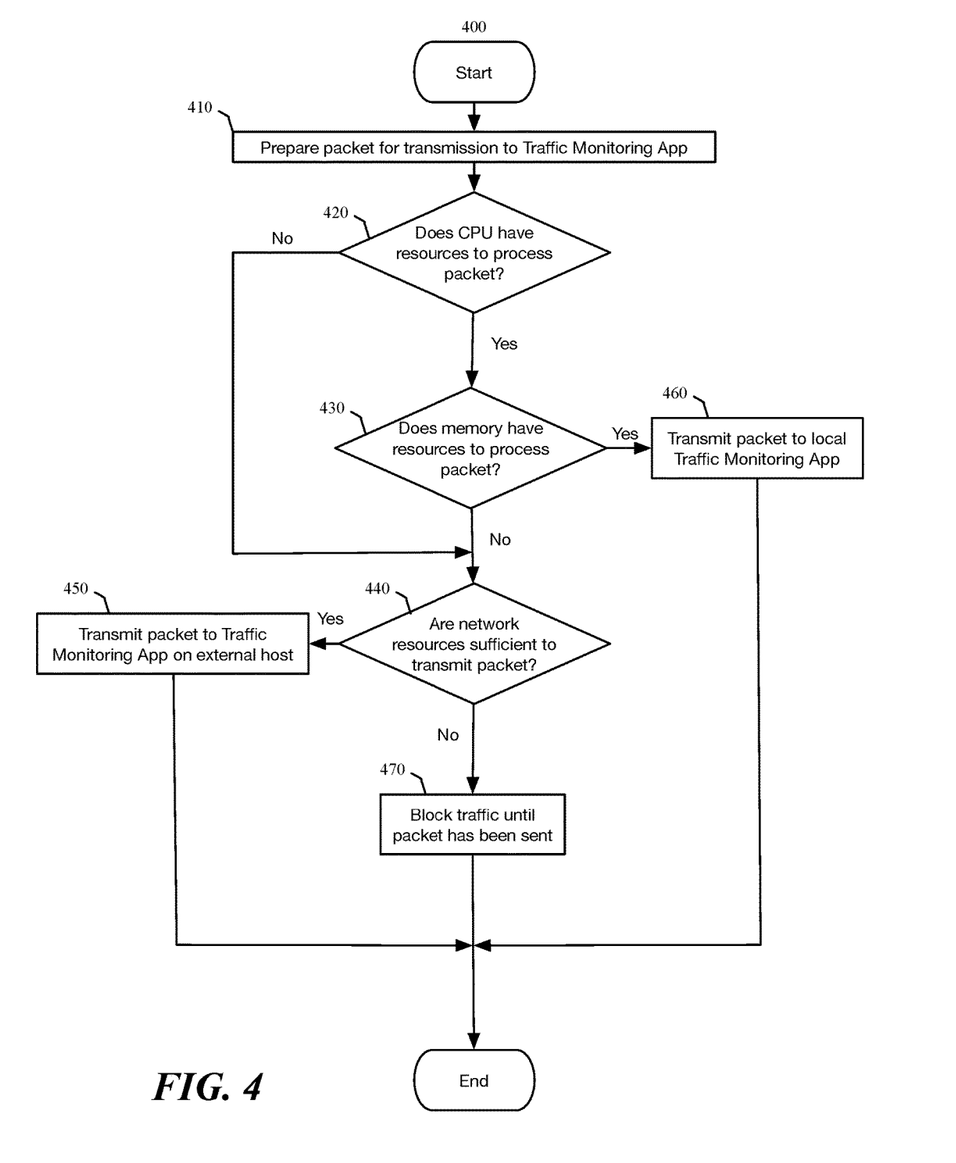
FIG. 4 conceptually illustrates a process for ensuring lossless packet mirroring.

In some embodiments, mirroring tap 190A determines if there are sufficient resources (e.g., CPU or memory) to forward mirrored packets to traffic monitoring applications 120A executing on the same host as mirroring tap 190A and, if resources are not sufficient, determine if there are sufficient resources (e.g., network resources) to forward the mirrored packets to, for example, traffic monitoring application 120B executing on a different host machine as described in relation to FIG. 4. It is understood that mirroring tap 190B may be implemented as in any of the embodiments discussed for mirroring tap 190A.

Traffic monitoring applications 160A and 160B store mirrored traffic data. Traffic monitoring applications 160A and 160B in some embodiments also perform analysis on the mirrored traffic data. In some embodiments, traffic monitoring application 160A includes three main components: configuration component 161A, storage component 162A, and analytics component 163A. The following discussion uses as an example traffic monitoring application 160A, however the discussion applies to traffic monitoring applications in general.

Configuration component 161A of some embodiments is responsible for configuration path, parsed-information, and packet data transmission. In some embodiments, configuration component 161A is a middle layer that acts as an agent between a central controller 170 and mirroring tap 190A. In some embodiments, configuration component 161A communicates with central controller 170 over a data pipe constructed to improve efficiency (e.g., a thrift data pipe). Configuration component 161A of some embodiments also consumes APIs (e.g., VIM-APIs) to communicate with configuration daemon (not shown) which provides a way to communicate with mirroring tap 190A. In some embodiments, configuration component 161A instructs storage component 162A to capture mirrored traffic.

Storage component 162A stores mirrored packets to allow for later analysis. In some embodiments, storage component 162A stores mirrored traffic data in a storage medium (e.g., RAM, or virtualized hard drive) in a format (e.g., libpcap) that will allow third party software (e.g., tcpdump and wireshark) to access the information. Storage component 162A of some embodiments stores each mirrored-traffic session in one or more files ordered by timeline. In some embodiments, storage component 162A implements an outdate strategy to help clean old and never-touched files (e.g., a Least Recently Used (LRU) algorithm).

Analytics component 163A performs analysis on the traffic data files stored by storage component 162A. In some embodiments, the analysis includes searching traffic data files for a specific condition, such as "TCP.src.ip=10.*.2.*" (where "*" indicates a wildcard character). Analytics component 163A of some embodiments parses the results of the analysis and returns the results in a form which can be more easily understood by a human such as, for example, an html document. In some embodiments, analytics component 163A returns the results of the analysis as unparsed data to a third-party software application. In some embodiments, APIs may be exposed that allow third-party software to perform analysis on the files stored by the traffic monitoring application.

Central controller 170 of some embodiments provides a way for a user to configure traffic mirroring and traffic analysis. In some embodiments, central controller 170 is provided as a plugin installed in VCenter (described on the internet). In some embodiments, the central controller 170 consumes APIs (e.g., VIM-APIs) to communicate with VCenter to fetch information such as a DCN's location, port-configuration, portgroup-configuration and vds-configuration. In some embodiments, central controller 170 can communicate with mirroring tap 190A through APIs (e.g., VIM-APIs). A data/command pipe (e.g., a thrift data pipe) is created in some embodiments between the central controller 170 and each traffic monitoring. In some embodiments, central controller 170 sends a query condition to a set of traffic monitoring applications (e.g., traffic monitoring applications 160A and 160B) for the traffic monitoring applications to perform an analysis using the query condition and to return the results. The returned results are parsed at the traffic monitoring applications in the set of traffic monitoring applications or at the central controller 170 for presentation to a user. In some embodiments, the central controller 170 exposes APIs for third-party applications to perform traffic analysis.

Figure 2:
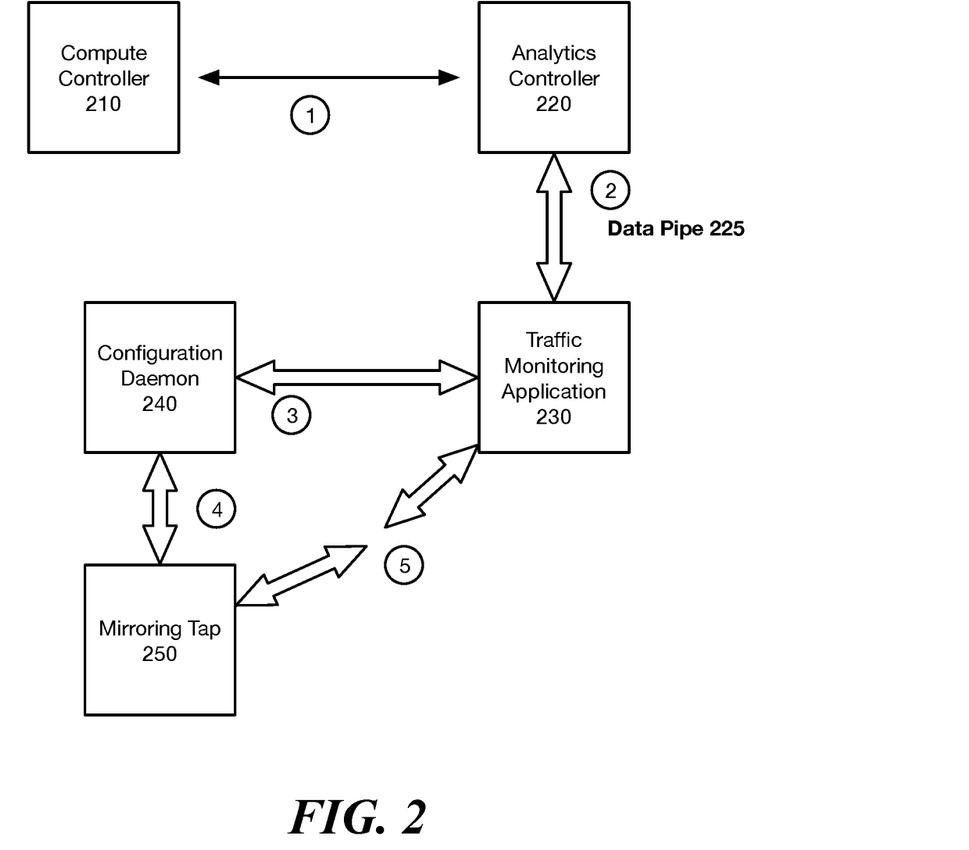
FIG. 2 illustrates example flows of information among the elements of the system for lossless packet monitoring.

FIG. 2 illustrates example flows of information among the elements of the system for lossless packet monitoring. In some embodiments, analytics controller 220 provides a user interface for receiving traffic mirroring configuration and traffic analysis requests. In some embodiments, analytics controller 220 communicates with compute controller 210 through APIs as depicted by the circled number '1' to fetch information it needs to implement the desired traffic monitoring (e.g., a location, port-configuration, portgroup-configuration, and vds-configuration of a DCN to be monitored).

Once traffic mirroring configuration or a traffic analysis request is received at analytics controller 220, analytics controller 220 communicates the configuration or request information to at least one traffic monitoring application 230 through data pipe 225 (e.g., a thrift data pipe) as depicted by the circled number '2'. Request information is processed by the traffic monitoring application 230 and the results of the requested traffic analysis are returned to analytics controller 220.

In some embodiments, traffic monitoring application 230 can communicate with configuration daemon 240 through exposed APIs (e.g., VIM-APIs) as depicted by the circled number '3'. Configuration information in some embodiments will be forwarded to configuration daemon 240 for further transmission to mirroring tap 250 as depicted by circled number '4'. Once the transmitted traffic-monitoring-configuration information is received by mirroring tap 250, it can begin mirroring traffic for identified DCNs executing on the same host as mirroring tap 250. Mirroring tap 250 determines whether to send mirrored packets to traffic monitoring application 230 or to a traffic monitoring application on another host machine (not shown). In some embodiments, mirrored packets sent to a traffic monitoring application on the same machine as a mirroring tap are sent using a layer 4 protocol (e.g., TCP), while mirrored packets sent to a traffic monitoring application not on the same host as the mirroring tap are sent using lower layers (e.g., Layer 3 or Layer 2). In some embodiments, all mirrored packets are sent using a TCP protocol to protect the integrity of the data.

Figure 3:
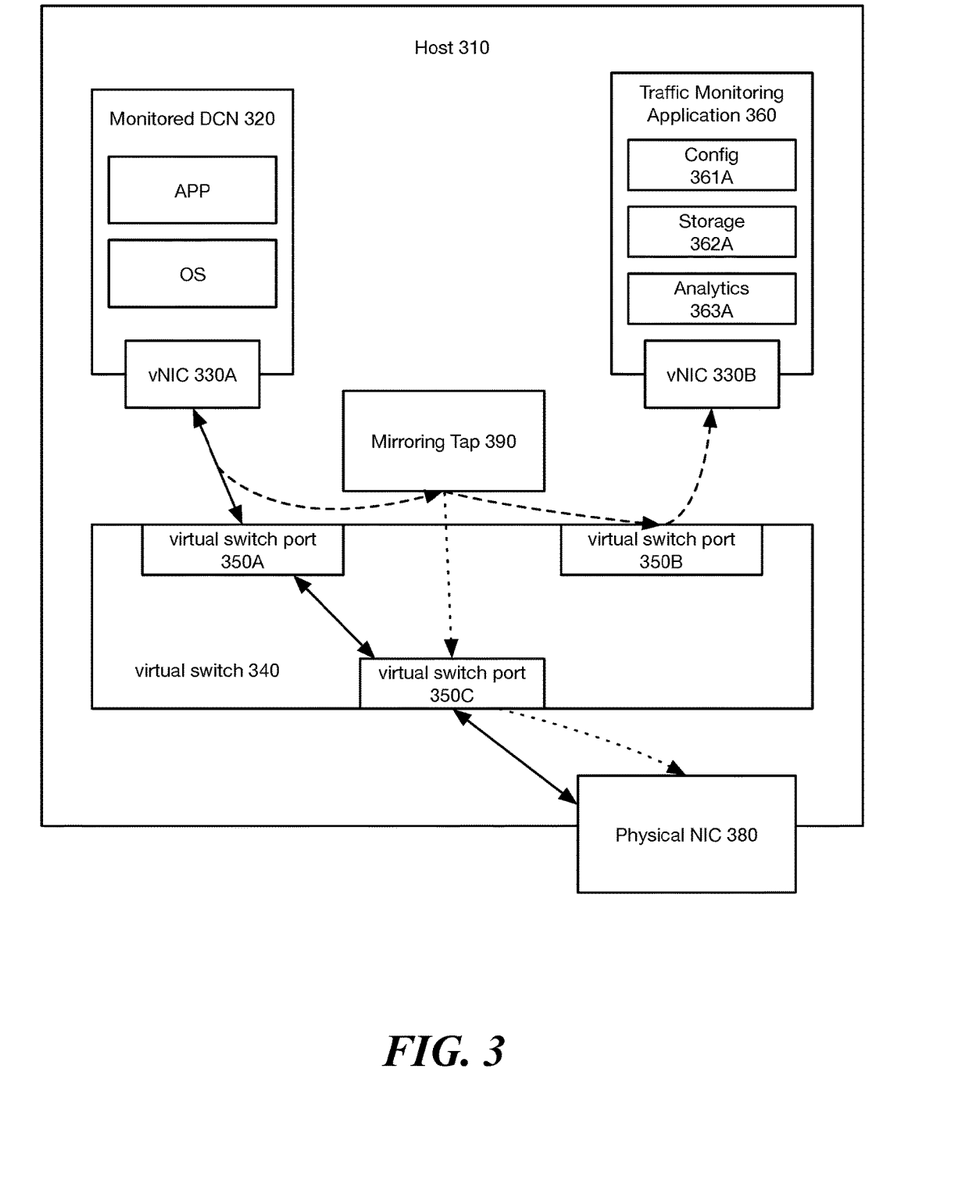
FIG. 3 illustrates a virtual tap executing on a host machine along with a monitored virtual machine (DCN) and a traffic monitoring application.

FIG. 3 illustrates a virtual tap (e.g., mirroring tap 390) executing on host 310 along with a monitored data compute node (DCN) 320 and a traffic monitoring application 360. FIG. 3 also illustrates mirroring tap 390 intercepting traffic from monitored DCN 320 and sending it alternatively to local traffic monitoring application 360 (indicated by a dashed line) or out of host 310 (indicated by a dotted line) to a traffic monitoring application on a separate host (not shown). Mirroring tap 390 in some embodiments determines whether to send mirrored packets to a local or external traffic monitoring application as part of the process conceptually illustrated in FIG. 4.

In some embodiments, mirroring tap 390 is executed as a kernel module within hypervisor 340. Mirroring tap 390, in some embodiments, may intercept monitored traffic at the I/O chain of hypervisor 340 in order to ensure lossless packet monitoring.

Figure 5:
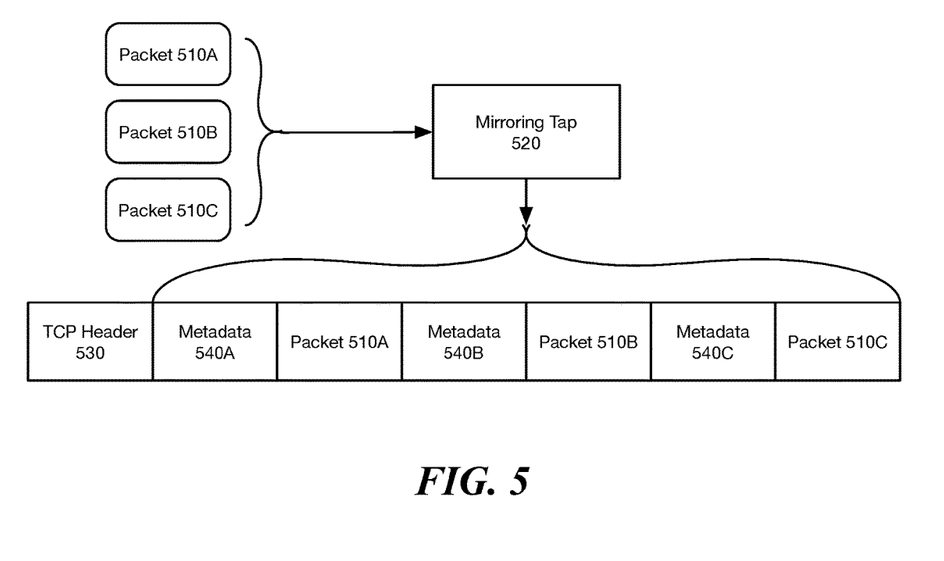
FIG. 5 illustrates mirrored packets being populated in a TCP payload.

FIG. 4 conceptually illustrates a process 400 that a mirroring tap (e.g., mirroring tap 190A or 190B) performs to ensure lossless packet mirroring. The process prepares packets for transmission to a traffic monitoring application (e.g., as depicted in FIG. 5) and then determines if the resources are available to send the prepared packets to a local or external traffic monitoring application or whether the mirroring tap must block further traffic until resources become available.

Process 400 begins by preparing (at 410) a mirrored traffic packet for transmission to a traffic monitoring application. In some embodiments, the packet may be, for example, individual mirrored packets, a TCP payload including a plurality of mirrored packets, or a TCP payload containing at least one mirrored packet and metadata relating to the at least one mirrored packet.

After the packet is prepared, in some embodiments, the process continues by determining (at 420) whether the CPU of the host machine (e.g. host machine 110A or 110B) has sufficient resources to process the packet for transmission to a local traffic monitoring application. If the mirroring tap determines that CPU resources are sufficient, the process then determines (at 430) if the host machine has sufficient memory resources to process the packet from transmission to a local traffic monitoring application. If the memory resources are sufficient, the process transmits (at 460) the packet to the local traffic monitoring application, and ends. That is, if the various hardware resources of the host machine are sufficient, the mirroring tap uses the local traffic monitoring application.

If the process, at either 420 or 430, determines that the local hardware resources are not sufficient, the process determines (at 440) if network resources are sufficient to transmit the packet to an external traffic monitoring application. If sufficient network resources are available, the process transmits (at 450) the packet to the external traffic monitoring application, then ends. In this case, the external traffic monitoring application is responsible for storing, analyzing, and/or reporting to an aggregator the mirrored packet.

If the network resources are insufficient to transmit the packet to the external traffic monitoring application, the process instead blocks (at 470) all traffic until the mirrored traffic packet is sent to either the external or local traffic monitoring application. That is, the DCNs on the host (or at least the DCN whose traffic cannot yet be mirrored to a traffic monitoring application) are prevented from sending any further traffic until the situation is resolved. This prevents the traffic monitoring application from missing any traffic sent by the DCNs that it monitors. After the mirrored traffic packet is sent, the process ends.

In the description of FIG. 4, sending mirrored packets to a local traffic monitoring application is prioritized over sending mirrored packets to an external traffic monitoring application. It is understood that operations 420 and 430 could be performed after operation 440 if the priorities were reversed (e.g., if CPU and memory resource conservation were prioritized), and that traffic would be blocked in operation 470 only when none of the CPU, memory, and network resources were sufficient. Similarly, it should be understood that operations 420 and 430 could be reversed, as it does not matter whether the processing or memory resources (or any other hardware resources) are checked first.

FIG. 5 illustrates mirrored packets being populated in a TCP payload. Packets 510A-C are packets that are being mirrored by mirroring tap 520. In some embodiments, mirroring tap 520 populates a TCP payload with the mirrored packets and in some embodiments includes metadata such as, for example, pcap metadata. In some embodiments, the packet and metadata indicated by the same final letter (e.g. packet 510A and metadata 540A) represent a packet and its related metadata. A traffic monitoring application in some embodiments distinguishes between metadata and mirrored packets by using the file format or the different files.

Figure 6:
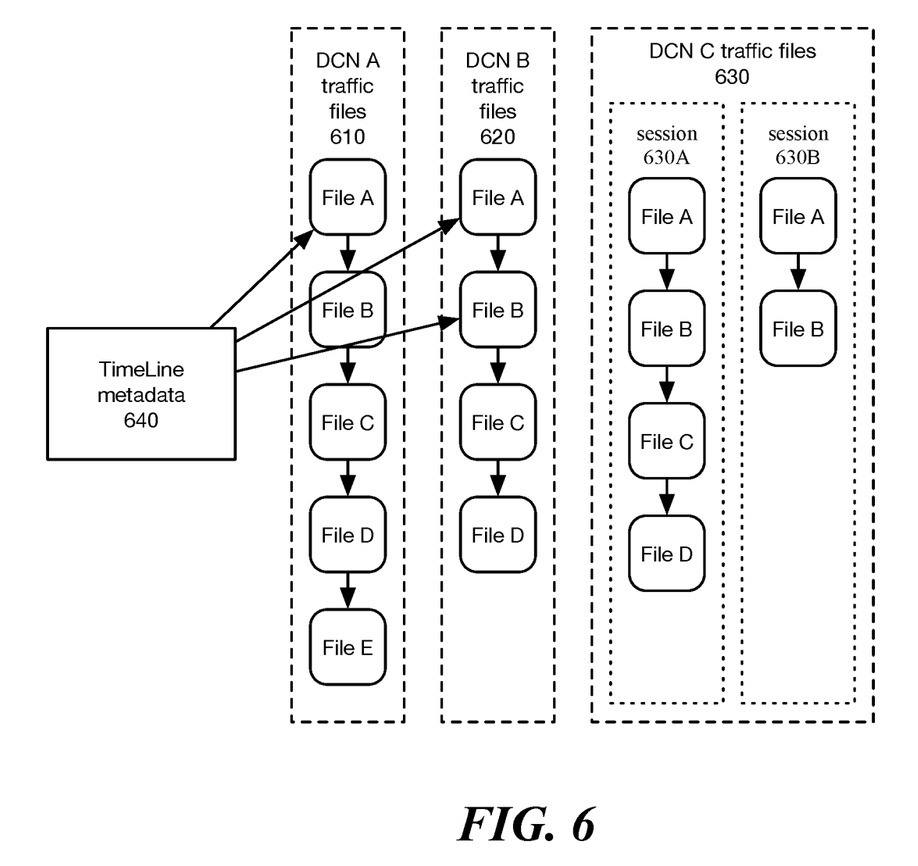
FIG. 6 illustrates a plurality of traffic data files separated by traffic flow and organized by time.

In some embodiments, the mirrored packets along with any included metadata as shown in FIG. 5, will be stored in data files at the traffic monitoring application as shown in FIG. 6. FIG. 6 illustrates a plurality of traffic data files separated by traffic flow and organized by time. In some embodiments, traffic monitoring application stores mirrored traffic data files separated by traffic session and organized by timeline. Stored traffic files 610-630 may represent traffic files for DCNs A-C respectively, additionally traffic files may be organized by traffic session so that each DCN could generate separate traffic files for separate sessions involving that DCN (e.g., for sessions 630A and 630B). In some embodiments, timeline metadata 640 stores the mapping relationship between the stored traffic files and the time they were received.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
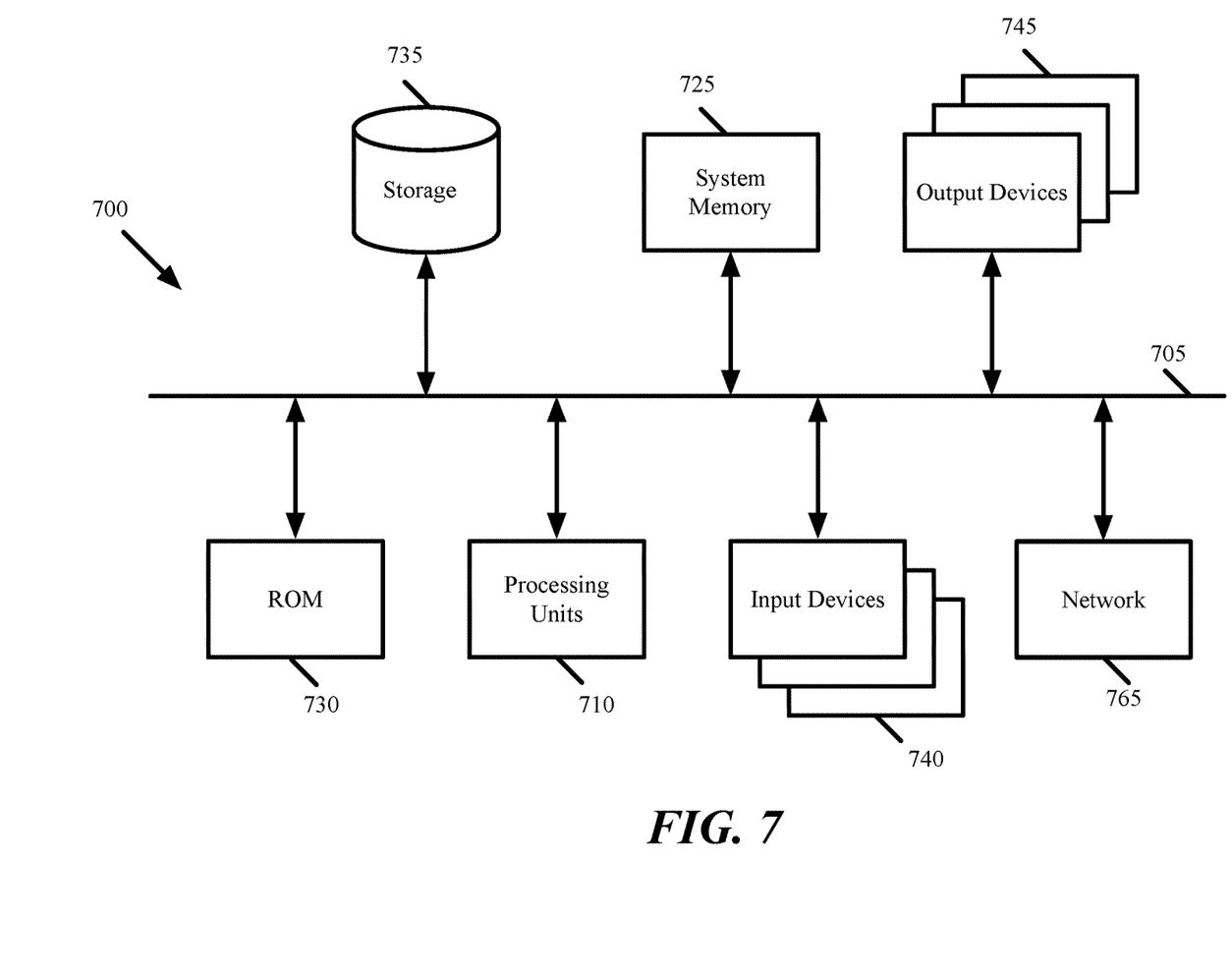
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

As used in this specification, the terms "switching element," "forwarding element," "managed switching/forwarding element," "virtual switching/forwarding element," and "logical switching/forwarding element" are consistent with the definitions provided in U.S. Pat. No. 9,077,664 which is incorporated herein by reference.

This specification refers throughout to computational and network environments that include data compute nodes (DCNs). Virtual machines are one example of data compute nodes (DCNs) or data compute end nodes, also referred to as addressable nodes. However, DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

A hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A system for traffic monitoring in a virtualized environment, the system comprising:
   a controller computer for managing traffic monitoring operations that execute on a set of host computers; and
   the set of host computers, each host computer in the set of host computers executing:
      at least a first virtual machine (VM) for which traffic is monitored;
      a second VM for monitoring traffic from the first VM;
      a software managed forwarding element (SMFE); and
      a virtual tap for copying packet data sent from the first VM to a port of the SMFE before the packet data reaches the SMFE and sending the copied packet data to the second VM of at least one of the host computers in the set of host computers before sending the original packet data to the SMFE as the copied packet has a higher priority than the original packet, wherein if resources are not sufficient to process the copied packet, the virtual tap blocks further traffic from the first VM until sufficient resources are available for the copied packet to be processed.

2. The system of claim 1, wherein the virtual tap executing on at least one host computer in the set of host computers executes within a hypervisor of the host computer.

3. The system of claim 1, wherein the virtual tap executing on at least one host computer in the set of host computers executes within a virtual network interface card (VNIC) of the first VM.

4. The system of claim 1, wherein the controller computer manages traffic monitoring operations by determining a set of VMs for which traffic monitoring will be performed.

5. The system of claim 1, wherein a first virtual tap executing on a first host computer sends the copied packet data to the second VM on the first host computer, while a second virtual tap on a second host computer sends the copied packet data to the second VM on a third host computer.

6. The system of claim 1, wherein:
   when a first host computer in the set of host computers has sufficient resources to process the copied packet, the virtual tap executing on the first host computer sends the copied packet data to the second VM executing on the first host computer; and
   when the first host computer in the set of host computers does not have sufficient resources for the second VM on the first host computer to process the copied packet data, the virtual tap sends the copied packet data to a second VM that executes on a different host computer than the first host computer.

7. The system of claim 1, wherein:
   the controller computer executes a central traffic monitoring application; and
   the second VMs executing on the set of host computers implement a distributed traffic monitoring system, wherein traffic monitoring applications executing on the second VMs jointly monitor traffic of the first VMs by providing traffic monitoring data to the central traffic monitoring application.

8. A non-transitory machine readable medium storing a program that when executed by at least one processing unit of a host computer replicates traffic for monitoring, the program comprising sets of instructions for:

identifying packet data sent from a first VM executing on the host computer to a port of a software managed forwarding element (SMFE) executing on the host computer;

copying the packet data prior to the packet data reaching the SMFE;

when resources are sufficient to process the copied packet, sending the copied packet data to a second VM in a set of VMs before sending the original packet data to the SMFE as the copied packet has a higher priority than the original packet, said set of VMs each executing a traffic monitoring application; and when resources are not sufficient to process the copied packet, blocking further traffic from the first VM until sufficient resources are available for the copied packet to be processed.

9. The non-transitory machine readable medium of claim 8, wherein the set of instructions for sending copied packet data further comprises a set of instructions for populating a TCP payload with the copied packet data.

10. The non-transitory machine readable medium of claim 9, wherein the set of instructions for populating the TCP payload with the copied packet data comprises a set of instructions for populating the TCP payload with metadata relating to the copied packet data.

11. The non-transitory machine readable medium of claim 8, wherein the set of instructions for blocking further traffic from the first VM when resources are not sufficient to process the copied packet comprises a set of instructions for, when a TCP-request list is longer than a threshold length, at least one of (i) preventing a virtual network interface card (VNIC) of the first VM from inserting data in an input output (I/O) ring of the VNIC, (ii) blocking a net output ring of a mirrored port, and (iii) dropping incoming packets on the mirrored port.

12. The non-transitory machine readable medium of claim 8, wherein the program further comprises a set of instructions for receiving, from a third VM, configuration information comprising an identification of at least one VM executing on the host computer for which to perform packet copying.

13. The non-transitory machine readable medium of claim 12, wherein the configuration information further comprises at least one of (i) a filter to apply to packet data before copying, (ii) a specification of a type of meta-data to send along with the copied packet data, and (iii) a format for the sent packet data.

14. The non-transitory machine readable medium of claim 8, wherein the set of VMs each executing a traffic monitoring application comprises a particular VM executing on the host computer, wherein the set of instructions for sending the copied packet data comprises sets of instructions for:

when the host computer has sufficient resources for the particular VM executing on the host computer process the packet, sending the copied packet data to the particular VM executing on the host computer for traffic monitoring; and when the host computer does not have sufficient resources, sending the copied packet data to another VM of the set of VMs that does not execute on the host computer for traffic monitoring instead of to the particular VM executing on the host computer.

15. The non-transitory machine readable medium of claim 14, wherein the other VM comprises a central controller for a traffic monitoring operation.

16. The non-transitory machine readable medium of claim 8, wherein a particular VM in the set of VMs each executing a traffic monitoring application exposes application programming interfaces (APIs) for third party applications to access copied packet data stored on the particular VM.

17. The non-transitory machine readable medium of claim 8, wherein copied packet data of a first particular traffic session is stored at a particular VM in the set of VMs as a time-ordered list of packets separate from copied packet data of a second particular traffic session.

18. The system of claim 1, wherein the virtual tap performs lossless copying of packets sent by the first VM without dropping any copied packet.

19. A method for replicating traffic for monitoring, the method comprising:

identifying packet data sent from a first VM executing on a host computer to a port of a software managed forwarding element (SMFE) executing on the host computer;

copying the packet data prior to the packet data reaching the SMFE; and when resources are sufficient to process the copied packet, sending the copied packet data to a second VM in a set of VMs before sending the original packet data to the SMFE as the copied packet has a higher priority than the original packet, said set of VMs each executing a traffic monitoring application, wherein when resources are not sufficient to process the copied packet, further traffic from the first VM is blocked until sufficient resources are available for the copied packet to be processed.

20. The method of claim 19, wherein the set of VMs each executing a traffic monitoring application comprises a particular VM executing on the host computer, wherein sending the copied packet data comprises:

when the host computer has sufficient resources for the particular VM executing on the host computer process the packet, sending the copied packet data to the particular VM executing on the host computer for traffic monitoring, wherein when the host computer does not have sufficient resources, the copied packet data is sent to another VM of the set of VMs that does not execute on the host computer for traffic monitoring instead of to the particular VM executing on the host computer.

* * * * *